(12) United States Patent
Yang et al.

(10) Patent No.: US 9,989,790 B2
(45) Date of Patent: Jun. 5, 2018

(54) DISPLAY DEVICE

(71) Applicant: SAMSUNG DISPLAY CO., LTD., Yongin, Gyeonggi-Do (KR)

(72) Inventors: Taehoon Yang, Yongin-si (KR); Jaewan Jung, Yongin-si (KR); Kiyong Lee, Cheonan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 230 days.

(21) Appl. No.: 14/447,742

(22) Filed: Jul. 31, 2014

(65) Prior Publication Data
US 2015/0173172 A1 Jun. 18, 2015

(30) Foreign Application Priority Data

Dec. 18, 2013 (KR) .................. 10-2013-0158434

(51) Int. Cl.
*G06F 1/16* (2006.01)
*G02F 1/1333* (2006.01)
(Continued)

(52) U.S. Cl.
CPC ...... *G02F 1/133305* (2013.01); *G02F 1/1333* (2013.01); *G02F 1/133308* (2013.01);
(Continued)

(58) Field of Classification Search
CPC ............. G02F 1/1333; G02F 1/133305; G02F 1/13338; G02F 1/13452; G02F 2001/133311; G02F 2001/133325; G02F 2001/133331; G02F 2001/133388; G02F 2001/133391; G02F 2001/13456; G02F 1/133308; G02F 1/133608; G02F 2001/133314; G02F 2001/133317; G02F 2001/13332; G02F 2001/133322; G02F 2001/133328; G06F 1/1626; G06F 1/1652; G06F 1/169; G06F 1/1601; G06F 1/16; G06F 1/1633; G06F 1/1613; G06F 1/1616; G06F 1/1654; G09F 9/301; G09F 9/33; H05K 5/02
USPC .... 361/749, 679.01, 679.31, 679.21, 679.26, 361/679.27, 679.29; 313/511, 483, 500, 313/501, 502, 503, 504, 505, 506, 510, 313/512; 349/12, 58; 174/50
See application file for complete search history.

(56) References Cited

U.S. PATENT DOCUMENTS 4,184,317 A  1/1980  Kanda et al.
2010/0073593 A1* 3/2010 Sasaki ............... B29D 11/00
349/58
(Continued)

FOREIGN PATENT DOCUMENTS

KR    1020110101906    9/2011

*Primary Examiner* — Binh Tran
(74) *Attorney, Agent, or Firm* — F. Chau & Associates, LLC

(57) ABSTRACT

A display device includes a display panel having a curved area and a substantially flat area, a guide unit including a curved area and a first area, and a casing unit. The first area of the display panel extends from a first end of the curved area of the display panel. The curved area of the guide unit supports the curved area of the display panel. The first area of the guide unit supports the first area of the display panel. The casing unit covers at least a portion of the curved area of the display panel.

20 Claims, 7 Drawing Sheets

(51) Int. Cl.
  *H05K 5/00* (2006.01)
  *H05K 7/00* (2006.01)
  *G02F 1/1335* (2006.01)

(52) U.S. Cl.
  CPC ............ *G02F 1/133608* (2013.01); *G02F 2001/13332* (2013.01); *G02F 2001/133311* (2013.01); *G02F 2001/133314* (2013.01); *G02F 2001/133317* (2013.01); *G02F 2001/133322* (2013.01); *G02F 2001/133325* (2013.01); *G02F 2001/133328* (2013.01); *G06F 1/1601* (2013.01); *G06F 1/1613* (2013.01); *G06F 1/1616* (2013.01); *G06F 1/1654* (2013.01)

(56) References Cited

U.S. PATENT DOCUMENTS

| | | | |
|---|---|---|---|
| 2010/0134960 A1 | 6/2010 | Su et al. | |
| 2011/0261002 A1* | 10/2011 | Verthein | G06F 1/181 345/174 |
| 2012/0081874 A1* | 4/2012 | Wu | G02F 1/1333 361/807 |
| 2013/0002133 A1* | 1/2013 | Jin | G06F 1/169 313/511 |
| 2013/0002572 A1* | 1/2013 | Jin | G02F 1/133305 345/173 |
| 2013/0076649 A1* | 3/2013 | Myers | H04M 1/0268 345/173 |
| 2014/0063719 A1* | 3/2014 | Yamazaki | G06F 1/1601 361/679.21 |
| 2014/0307396 A1* | 10/2014 | Lee | H05K 1/028 361/749 |

* cited by examiner

DISPLAY DEVICE

CROSS-REFERENCE TO RELATED APPLICATIONS

This application claims priority under 35 U.S.C. § 119 to Korean Patent Application No. 10-2013-0158434, filed on Dec. 18, 2013, the disclosure of which is hereby incorporated by reference in its entirety.

TECHNICAL FIELD

Exemplary embodiments of the present invention relate to a display device, and more particularly, to a display device including a curved portion.

DISCUSSION OF THE RELATED ART

Various types of display devices having improved characteristics such as improved thickness, weight, and power consumption have replaced cathode ray tube (CRT) displays. Such an improved display device includes, for example, a liquid crystal display (LCD), a plasma display panel (PDP), a field emission display (FED), an organic electroluminescence device (OLED), and an electrophoretic display (EPD).

Flexible display devices formed using a flexible material such as, for example, plastic, are capable of displaying images when being bent. Flexible display devices may be used in electronic devices such as, for example, portable computers, electronic newspapers, and smart cards, and may be used to replace traditional printing mediums such as, for example, books, newspapers, and magazines.

SUMMARY

Exemplary embodiments of the present invention provide a display device that may prevent a curved portion from becoming flat.

Exemplary embodiments of the present invention further provide a display device that may decrease a size of a bezel.

Exemplary embodiments of the present invention provide a display device including a display panel including a curved area having a curved portion and a first area, wherein the first area is connected to one end of the curved area and is flat, a guide unit including a curved guide unit and a first guide unit, wherein the curved guide unit supports the curved area and the first guide unit supports the first area, and a casing unit covering at least a portion of the curved area.

In exemplary embodiments, the curved area may have multiple curvatures.

In exemplary embodiments, the curved area may include a plurality of curved portions.

In exemplary embodiments, the curved area may have a certain curvature.

In exemplary embodiments, a shape of the guide unit may be similar to a shape of the display panel.

In exemplary embodiments, each of the curved areas may include a first curved area connected to one end of the first area, and a second curved area connected to the other end of the first area.

In exemplary embodiments, the first area may include a display area in which an image is displayed.

In exemplary embodiments, the curved area may include a non-display area in which an image is not displayed.

In exemplary embodiments, at least a portion of the curved area which the casing unit does not cover may include a display area in which an image is displayed.

In exemplary embodiments, the guide unit may be formed of one or more materials including a metal, plastic, an organic material, an inorganic material and an organic and inorganic composite material.

In exemplary embodiments, the display panel may further include a second area connected to the other end of the curved area, and the guide unit may further include a second guide unit that supports the display panel and corresponds to the second area.

In exemplary embodiments, the second area may be overlapped with the first area on a plane and is flat.

In exemplary embodiments, the second guide unit may have a length different from the second area.

In exemplary embodiments, the second area may include a non-display area in which an image is not displayed.

In exemplary embodiments, the casing unit may be extended from the second area and cover at least a portion of the second area.

In exemplary embodiments, the guide unit may further include a guide hook connected to the second guide unit, the guide hook being combined with the second area to fix the guide unit and the display panel.

In exemplary embodiments, the display panel may further include a display panel hook connected to the second area, the display panel hook being combined with the second guide unit to fix the guide unit and the display panel.

Exemplary embodiments of the present invention provide a display panel including a curved area and a substantially flat first area, wherein the first area extends from a first end of the curved area, a guide unit including a curved area and a first area, wherein the curved area of the guide unit supports the curved area of the display panel, and the first area of the guide unit supports the first area of the display panel, and a casing unit covering at least a portion of the curved area of the display panel.

Exemplary embodiments of the present invention provide a display panel including a curved area and a substantially flat area extending from the curved area, a guide unit including a curved area and a substantially flat area extending from the curved area of the guide unit, and a casing unit covering at least a portion of the curved area of the display panel, wherein a shape of the curved area of the display panel is substantially the same as a shape of the curved area of the guide unit.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
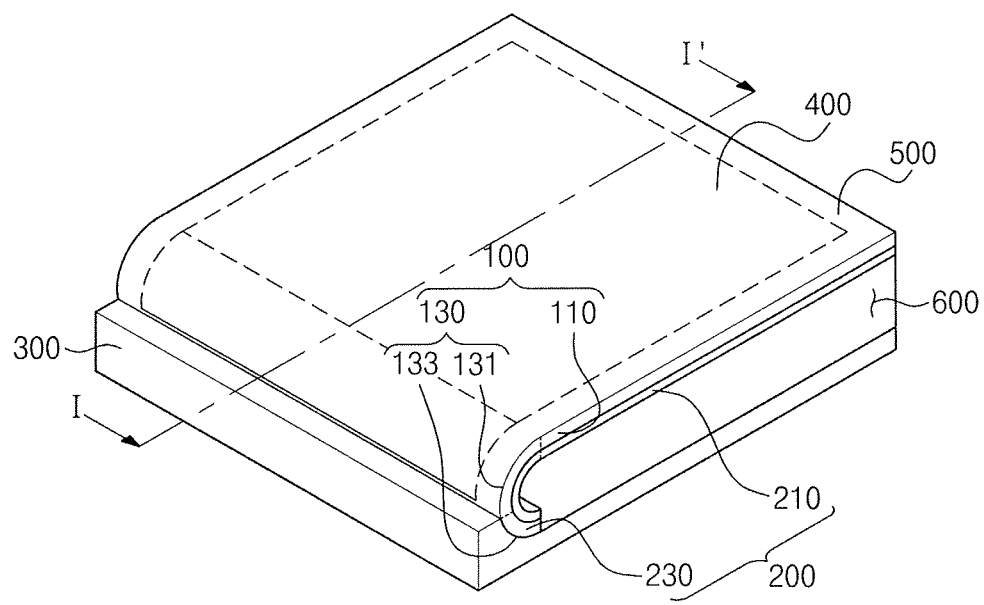
FIG. 1 is a schematic perspective view of a display device according to an exemplary embodiment of the present invention.

Exemplary embodiments of the present invention will be described more fully hereinafter with reference to the accompanying drawings. Like reference numerals may refer to like elements throughout the accompanying drawings.

In the drawings, the thickness of layers, films, panels, regions, etc., may be exaggerated for clarity. It will further be understood that when an element such as a layer, a film, an area, a plate, etc., is referred to as being "on" another element, it can be directly on the other element or intervening elements may also be present.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

A display device according to exemplary embodiments of the present invention is described below.

FIG. 1 is a schematic perspective view of a display device according to an exemplary embodiment of the present invention.

Figure 2:
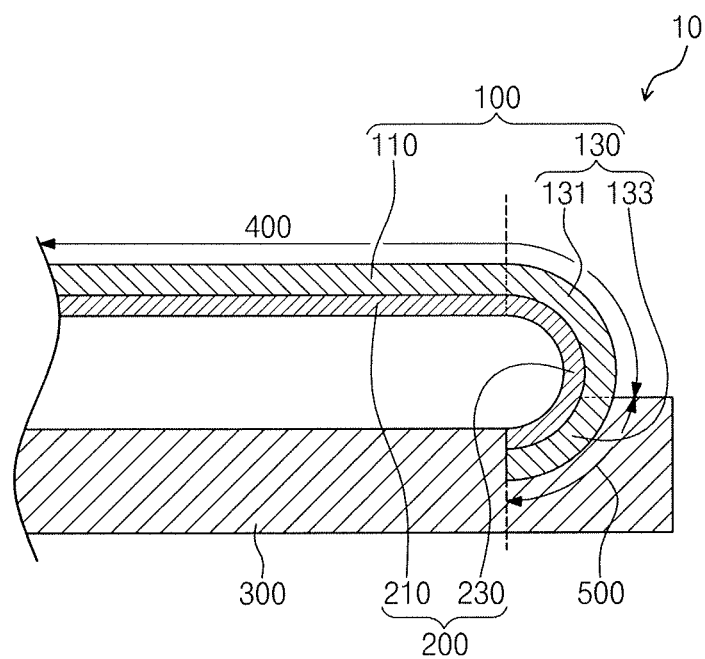
FIG. 2 is a schematic cross-sectional view taken along line I-I' of FIG. 1.

FIG. 2 is a schematic cross-sectional view taken along line I-I' of FIG. 1.

Referring to FIGS. 1 and 2, a display device 10 according to an exemplar embodiment of the present invention includes a display panel 100, a guide unit 200, and a casing unit 300.

The display panel 100 may be, for example, a liquid crystal display panel, an organic light-emitting display panel, an electrophoretic display panel, or an electrowetting display panel. However, the display panel 100 is not limited thereto.

The display panel 100 includes a curved area 130 and a first area 110.

The curved area 130 is a curved portion of the display panel 100.

Figure 3A:
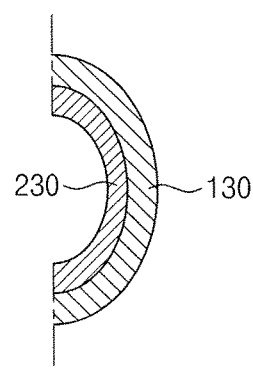
FIGS. 3A-3C are schematic cross-sectional views showing various shapes of a curved area of a display panel according to exemplary embodiments of the present invention.
Figure 3B:
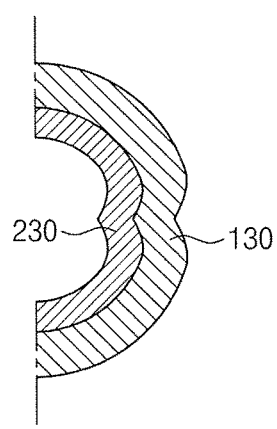
Figure 3C:
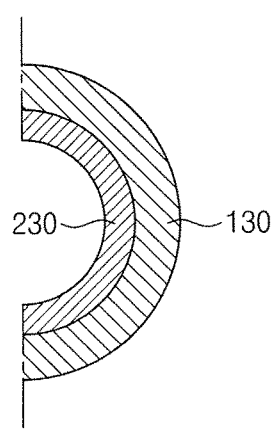

FIGS. 3A-3C are schematic cross-sectional views showing various shapes of the curved area of the display panel 100, according to exemplary embodiments of the present invention.

Referring to FIGS. 3A-3C, the curved area 130 of the display panel 100 may have multiple curvatures. For example, referring to FIG. 3A, the curved area 130 may have a shape corresponding to a portion of an ellipse, however the curved area 130 is not limited thereto. For example, the shape of the curved area 130 may be an ellipse (e.g., an oval shape).

Referring to FIG. 3B, the curved area 130 of the display panel 100 may include a plurality of curved portions. For example, the curved area 130 may have a wave shape including a plurality of different curved portions, however the curved area 130 is not limited thereto.

Referring to FIG. 3C, the curved area 130 of the display panel 100 may have a certain curvature. For example, the curved area 130 may have a semicircle shape, however the curved area 130 is not limited thereto.

Referring to FIGS. 1 and 2, the curved area 130 of the display panel 100 may include a non-display area 500 in which an image is not displayed. For example, a curved area 133 covered by the casing unit 300 may correspond to the non-display area 500 in which an image is not displayed. However, exemplary embodiments of the present invention are not limited thereto, and a curved area 131 that is not covered by the casing unit 300 may correspond to the non-display area 500 in which an image is not displayed. The non-display area 500 may include various circuit(s) and wire(s) that supply an image signal to a display area 400.

At least a portion of the curved area 131 not covered by the casing unit 300 may include the display area 400 in which an image is displayed. Since at least a portion of the curved area 131 not covered by the casing unit 300 includes the display area 400, a bezel portion of the display device 10 in which an image is not displayed may be reduced.

The first area 110 of the display panel 100 may extend from one end of the curved area 130 of the display panel 100 and may be substantially flat. The first area 110 of the display panel 100 may include the display area 400 in which an image is displayed.

The display device 10 includes the guide unit 200 that supports the display panel 100. The support provided by the guide unit 200 may prevent a curved portion from becoming flat when the curved area 130 of the display panel 100 has a curvature.

The display panel 100 and the guide unit 200 may be attached to each other, for example, through an adhering layer or through a separate adhering member.

The guide unit 200 may be formed of one or more materials capable of preventing a curved portion from becoming flat, and capable of maintaining the shape of the display panel 100 when the curved area 130 of the display panel 100 has a curvature. For example, the guide unit 200 may be formed of one or more materials including, for example, metal, plastic, an organic material, an inorganic material, and organic and inorganic composite materials. However, the materials are not limited thereto.

The guide unit 200 includes a curved area 230 and a first area 210. The curved area 230 and the first area 210 may be formed of a single component or multiple components.

The curved area of the guide unit 230 supports the curved area 130 of the display panel 100 and corresponds to the curved area 130 of the display panel 100.

The shape of the curved area of the guide unit 230 may be substantially the same as that of the curved area 130 of the display panel 100. When the shape of the curved area of the guide unit 230 is substantially the same as that of the curved area 130 of the display panel 100, the curved area 130 of the display panel 100 may be prevented from becoming flat as a result of the support provided to the curved area 130 of the display panel 100 by the curved area of the guide unit 230.

The first area of the guide unit 210 supports the first area 110 of the display panel 100 and corresponds to the first area 110. The first area of the guide unit 210 may extend from the curved area of the guide unit 230, and may disperse a restoration force that could cause the curved area to become flat. The shape of the first area of the guide unit 210 may be substantially the same as that of the first area 110 of the display panel 100, and may effectively support the first area 110 of the display panel 100.

According to exemplary embodiments, the length of the first area of the guide unit 210 may be substantially the same as the length of the first area 110 of the display panel 100, or the length of the first area 110 of the display panel 100 may be longer than the length of the first area of the guide unit 210.

The display device 10 may further include an adhering layer disposed between the display panel 100 and the guide unit 200. The adhering layer may reinforce the attachment of the display panel 100 and the guide unit 200, and may enable the guide unit 200 to effectively support the display panel 100, thus preventing the curved area 130 of the display panel 100 from becoming flat.

The display device 10 includes the casing unit 300. The casing unit 300 is formed on the curved area 130 of the display panel 100 and covers at least a portion of the display panel 100. For example, the casing unit 300 may wholly or partially cover the curved area 130 of the display panel 100.

The external surface of the curved area 130 of the display panel 100 (e.g., the outer surface of the curved area 130 opposite the surface that contacts the guide unit 200) faces the internal surface of the casing unit 300, and may contact and be attached to the internal surface of the casing unit 300. For example, the external surface of the curved area 130 of the display panel 100 may be attached to the internal surface of the casing unit 300 via an adhering layer or a separate adhering member.

The casing unit 300 may have various shapes in consideration of the design aspects of the display device 10. The casing unit 300 may protect the curved area 130 of the display panel 100. Further, referring to a cross-sectional view, since the curved area 130 of the display panel 100 may be located on a neutral plane, a restoration force that could cause the curved area 130 to become flat may be dispersed.

The casing unit 300 may be formed of one or more materials including, for example, metal, plastic, an organic material, an inorganic material, and organic and inorganic composite materials, however the materials are not limited thereto.

The curved area 133 covered by the casing unit 300 may correspond to the non-display area 500 in which an image is not displayed. However, exemplary embodiments of the present invention are not limited thereto. For example, at least a portion of the curved area 131 that is not covered by the casing unit 300 may correspond to the non-display area 500 in which an image is not displayed.

Further, at least a portion of the curved area 131 that is not covered by the casing unit 300 may include the display area 400 in which an image is displayed. Since at least a portion of the curved area 131 that is not covered by the casing unit 300 may include the display area 400, a bezel portion of the display device 10 in which an image is not displayed may be reduced.

In an exemplary embodiment, an insulating layer 600 may be formed between the casing unit 300 and the guide unit 200, however exemplary embodiments are not limited thereto. For example, in exemplary embodiments, the space occupied by the insulating layer 600 may instead include the guide unit 200, the casing unit 300 or a separate support unit, or may be empty.

Since the guide unit 200 may support the display panel 100 and disperse a restoration force that could cause the curved area 130 of the display panel 100 to become flat, the display device 10 according to exemplary embodiments of the present invention may prevent the curved area 130 of the display panel 100 from becoming flat. Further, since at least a portion of the curved area 130 of the display panel 100 which the casing unit 300 does not cover includes the display area 400 in which an image is displayed, a bezel portion may be reduced.

A display device according to an exemplary embodiment of the present invention is described below with reference to FIG. 4. For convenience of explanation, a description of elements previously described may be omitted, and reference to these elements may be made when describing the exemplary embodiment with reference to FIG. 4.

Figure 4:
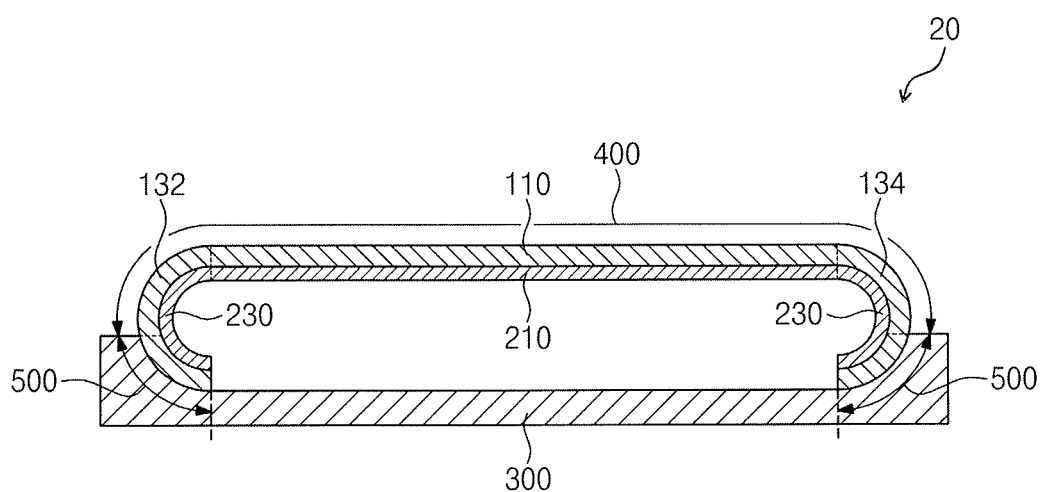
FIGS. 4 to 7 are schematic cross-sectional views of a display device according exemplary embodiments of the present invention.

FIG. 4 is a schematic cross-sectional view of a display apparatus according to an exemplary embodiment of the present invention.

Referring to FIG. 4, a display device 20 according to an exemplary embodiment of the present invention includes the display panel 100, the guide unit 200, and the casing unit 300.

The display panel 100 includes the curved area 130 and the first area 110.

The curved area 130 may include a first curved area 132 extending from one end of the first area 110 and a second curved area 134 extending from the other end of the first area 110. That is, the display device 20 may include two or more curved areas 130.

The display device 20 may include a plurality of curved areas 130 of the display panel 100 and a plurality of curved areas of the guide units 230 supporting the curved areas 130 of the display panel 100. The display device 20 may further include a plurality of areas of the casing unit 300 that are formed on the curved areas 130 of the display panel 100 and cover at least a portion of each of the curved areas 130. In this case, the shape of the first curved area 132 and that the shape of the second curved area 134 may be the same as each other, or may be different from each other.

As a result, the curved area 130 of the display panel 100 may be prevented from becoming flat. Further, since at least a portion of the curved area 130 of the display panel 100 which the casing unit 300 does not cover includes the display area 400 in which an image is displayed, a bezel portion may be reduced.

A display device according to an exemplary embodiment of the present invention is described below with reference to FIG. 5. For convenience of explanation, a description of elements previously described may be omitted, and reference to these elements may be made when describing the exemplary embodiment with reference to FIG. 5.

Figure 5:
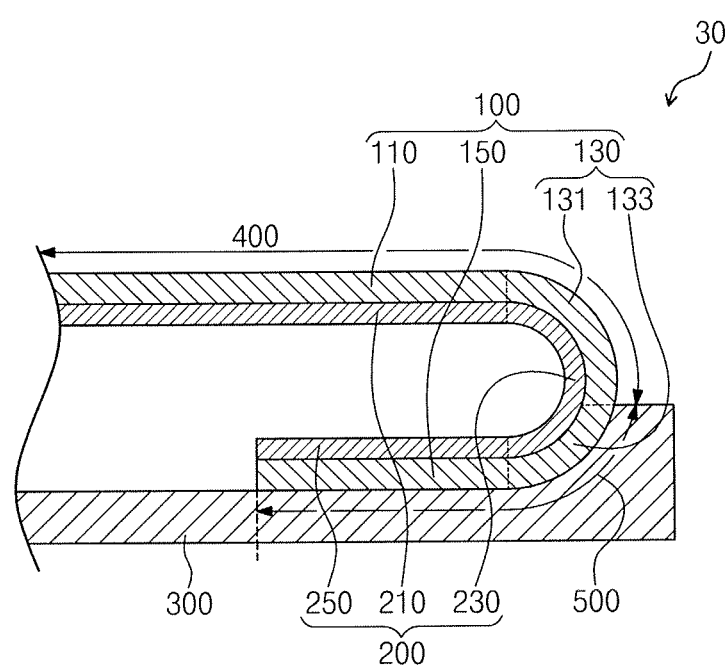

FIG. 5 is a schematic cross-sectional view of a display device according to an exemplary embodiment of the present invention.

Referring to FIG. 5, a display device 30 according to an exemplary embodiment of the present invention includes the display panel 100, the guide unit 200, and the casing unit 300.

The display panel 100 includes the curved area 130, the first area 110 and a second area 150 of the display panel 100. The second area 150 of the display panel 100 extends from the other end of the curved area 130 of the display panel 100. That is, the second area 150 extends from an opposite end of the curved area 130 relative to the first area 110, as shown in FIG. 5.

The second area 150 of the display panel 100 may be formed under the first area 110 of the display panel 100 and may be substantially flat. The second area 150 of the display panel 100 may include the non-display area 500 in which an image is not displayed.

The guide unit 200 includes a second area 250. The first area 210, the curved area 230, and the second area 250 of the guide unit 200 may be a single component or multiple components. The second area of the guide unit 250 supports the second area 150 of the display panel 100 and corresponds to the second area 150 of the display panel 100. The second area of the guide unit 250 may extend from the curved area of the guide unit 230, and thus may disperse a restoration force that could cause the curved area 130 of the display panel 100 to become flat. The shape of the second area of the guide unit 250 may be substantially the same as that of the second area 150 of the display panel 100, and thus, the second area of the guide unit 250 may effectively support the second area 150 of the display panel 100.

The length of the second area of the guide unit 250 may be the same as or different from that of the second area 150 of the display panel 100.

The casing unit 300 may extend from the second area 150 of the display panel 100. The area of the casing unit 300 that extends from the second area 150 of the display panel 100 may cover at least a portion of the second area 150 of the display panel 100. For example, the area of the casing unit 300 that extends from the second area 150 of the display panel 100 may wholly or partially cover the second area 150 of the display panel 100. The area of the casing unit 300 that extends from the second area 150 of the display panel 100 may protect the second area 150 of the display panel 100.

Figure 6:
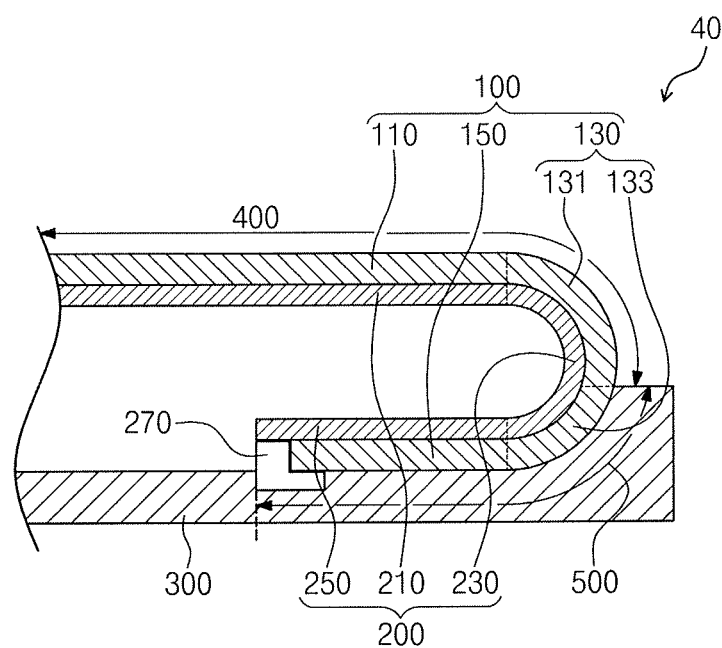
Figure 7:
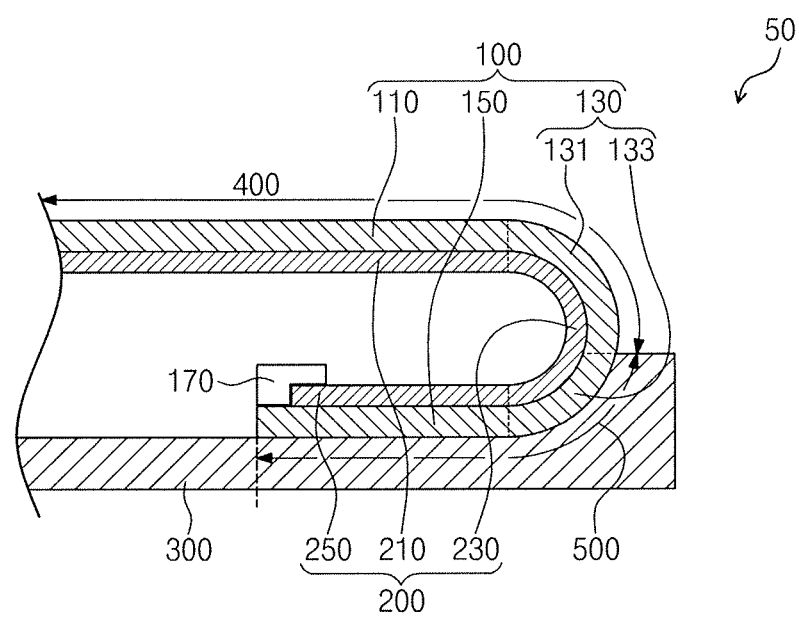

FIGS. 6 and 7 are schematic cross-sectional views of display devices according to exemplary embodiments of the present invention.

Referring to FIGS. 6 and 7, display devices 40 and 50 according to exemplary embodiments of the present invention each include the display panel 100, the guide unit 200, and the casing unit 300.

The display panel 100 includes the curved area 130, the first area 110, and the second area 150. The second area 150 extends from the other end of the curved area 130, as described above with reference to FIG. 5.

The second area 150 of the display panel 100 may be formed under the first area 110 and may be substantially flat. The display devices 40 and 50 each may further include a unit for fixing the guide unit 200 and the display panel 100, as described in further detail below. By fixing the guide unit 200 and the display panel 100 through the fixing unit, a restoration force that could cause the curved area 130 of the display panel 100 to become flat may be dispersed.

Referring to FIG. 6, the guide unit 200 may further include a guide hook 270 connected to the second area of the guide unit 250. The guide hook 270 may be attached to the second area 150 of the display panel 100 to fix the guide unit 200 to the display panel 100. Since the guide hook 270 fixes the guide unit 200 to the display panel 100, a restoration force that could cause the curved area 130 of the display panel 100 to become flat may be dispersed.

Referring to FIG. 7, the display panel 100 may further include a display panel hook 170 connected to the second area 150 of the display panel 100. The display panel hook 170 may be attached to the second area of the guide unit 250 to fix the guide unit 200 to the display panel 100. Since the display panel hook 170 fixes the guide unit 200 to the display panel 100, a restoration force that could cause the curved area 130 of the display panel 100 to become flat may be dispersed.

According to exemplary embodiments of the present invention, a display device may disperse a restoration force that could cause the curved area 130 of the display panel 100 to become flat, as a result of the guide unit 200 supporting the display panel 100. Thus, the curved area 130 of the display panel 100 may be prevented from becoming flat. Further, since at least a portion of the curved area 130 which the casing unit 300 does not cover includes the display area 400 in which an image is displayed, a bezel portion may be reduced.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A display device, comprising:
a display panel comprising a curved area, a flat first area, and a flat second area, wherein the first area extends from a first end of the curved area, and the second area extends from a second end of the curved area of the display panel that opposes the first end of the curved area of the display panel;
a guide unit comprising a curved area, a flat first area, and a flat second area, wherein the curved area of the guide unit supports the curved area of the display panel, the first area of the guide unit supports the first area of the display panel, and the second area of the guide unit supports the second area of the display panel,
wherein the second area of the guide unit opposes the first area of the guide unit and extends substantially parallel to the first area of the guide unit; and
a casing unit comprising a portion having a curvature that is about equal to a curvature of a portion of the curved area of the display panel, wherein the portion of the casing unit covers the portion of the curved area of the display panel,
wherein the first area of the guide unit extends from a first end of the curved area of the guide unit, and the second area of the guide unit extends from a second end of the curved area of the guide unit that opposes the first end of the curved area of the guide unit.

2. The display device of claim 1, wherein a shape of the curved area of the display panel is an ellipse.

3. The display device of claim 1, wherein the curved area of the display panel comprises a plurality of curved portions.

4. The display device of claim 1, wherein a shape of the curved area of the display panel is a semicircle.

5. The display device of claim 1, wherein a shape of the guide unit is substantially the same as a shape of the display panel.

6. The display device of claim 1, wherein the curved area of the display panel comprises a first curved area extending from a first end of the first area of the display panel, and a second curved area extending from a second end of the first area of the display panel, opposing the first end of the first area of the display panel.

7. The display device of claim 1, wherein the first area of the display panel corresponds to the display area in which the image is displayed.

8. The display device of claim 1, wherein the curved area of the display panel corresponds to a non-display area in which the image is not displayed.

9. The display device of claim 1, wherein at least a portion of the curved area of the display panel that is not covered by the casing unit corresponds to the display area in which the image is displayed.

10. The display device of claim 1, wherein the guide unit comprises a metal.

11. The display device of claim 1, wherein the second area of the display panel overlaps the first area of the display panel and is substantially flat.

12. The display device of claim 1, wherein the second area of the guide unit has a length different from the second area of the display panel.

13. The display device of claim 1, wherein the second area of the display panel corresponds to a non-display area in which the image is not displayed.

14. The display device of claim 1, wherein the easing unit extends from the second area of the display panel and covers at least a portion of the second area of the display panel.

15. The display device of claim 1, wherein the guide unit further comprises a guide hook connected to the second area of the guide unit, and the guide hook attaches the guide unit to the display panel.

16. The display device of claim 1, wherein the display panel further comprises a display panel hook connected to the second area of the display panel, and the display panel hook attaches the guide unit to the display panel.

17. A display device, comprising:
- a display panel comprising a curved area and a substantially flat area extending from the curved area;
- a guide unit comprising a curved area and a substantially flat area extending from the curved area of the guide unit, wherein the guide unit supports the display panel; and
- a casing unit comprising a portion having a curvature that is about equal to a curvature of a portion of the curved area of the display panel, wherein the portion of the casing unit covers the portion of the curved area of the display panel,
- wherein a shape of the curved area of the display panel is substantially the same as a shape of the curved area of the guide unit,
- wherein the display panel wraps around and covers a top surface of the guide unit,
- wherein the curved area of the display panel comprises a first area covered by the casing unit and a second area between the first area and the flat area of the display panel, and the second area displays an image,
- wherein the curved area of the guide unit is attached to an entirety of the curved area of the second surface of the display panel, and the substantially flat area of the guide unit is attached to an entirety of the substantially flat area of the second surface of the display panel.

18. The display device of claim 17, wherein the flat area of the display panel and the second area of the curved area of the display panel together from a display area in which the image is displayed.

19. The display device of claim 17, wherein the curved area of the display panel comprises a plurality of curved portions.

20. A display device, comprising:
- a display panel comprising a curved area, a substantially flat first area, and a second area, wherein the first area extends from a first end of the curved area, and the second area extends from a second end of the curved area opposing the first end of the curved area;
- a guide unit comprising a curved area, a first area, and a second area, wherein the curved area of the guide unit supports the curved area of the display panel, the first area of the guide unit supports the first area of the display panel, and the second area of the guide unit supports the second area of the display panel;
- a casing unit covering at least a portion of the curved area of the display panel; and
- a hook connected to the second area of the guide unit, wherein the hook attaches the guide unit to the display panel,
- wherein the display panel comprises a first surface having a display area in which an image is displayed, and a second surface opposing the first surface,
- wherein the guide unit is attached to the second surface.

* * * * *